(12) United States Patent
Usukura et al.

(10) Patent No.: US 8,111,356 B2
(45) Date of Patent: Feb. 7, 2012

(54) LIQUID CRYSTAL DISPLAY PANEL PROVIDED WITH MICROLENS ARRAY, METHOD FOR MANUFACTURING THE LIQUID CRYSTAL DISPLAY PANEL, AND LIQUID CRYSTAL DISPLAY DEVICE

(75) Inventors: Naru Usukura, Matsusaka (JP); Satoshi Shibata, Nara (JP); Takuma Tomotoshi, Tenri (JP); Takehiro Murao, Taki-gun (JP); Eiichi Urakubo, Tenri (JP); Toshiyuki Yoshimizu, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 267 days.

(21) Appl. No.: 12/440,791

(22) PCT Filed: Jul. 23, 2007

(86) PCT No.: PCT/JP2007/064448
§ 371 (c)(1),
(2), (4) Date: Mar. 11, 2009

(87) PCT Pub. No.: WO2008/032490
PCT Pub. Date: Mar. 20, 2008

(65) Prior Publication Data
US 2009/0284683 A1 Nov. 19, 2009

(30) Foreign Application Priority Data
Sep. 12, 2006 (JP) ................................. 2006-247135

(51) Int. Cl.
*G02F 1/1335* (2006.01)
(52) U.S. Cl. .......................................................... 349/95
(58) Field of Classification Search ...................... 349/95
See application file for complete search history.

(56) References Cited

U.S. PATENT DOCUMENTS
4,345,249 A 8/1982 Togashi
(Continued)

FOREIGN PATENT DOCUMENTS
CN 1544985 A 11/2004
(Continued)

OTHER PUBLICATIONS
International Search Report for PCT/JP2007/064448 mailed Aug. 21, 2007.
(Continued)

*Primary Examiner* — Sung Pak
(74) *Attorney, Agent, or Firm* — Nixon & Vanderhye P.C.

(57) ABSTRACT

There is provided a liquid crystal display panel with microlenses in which deformation, peeling, and the like of an optical film are not likely to occur and which has a good displaying quality.
A liquid crystal display panel according to the present invention includes: a microlens array provided on a light-incident side of a liquid crystal display panel; a support provided on the light-incident side of the liquid crystal display panel so as to surround the microlens array; and an optical film attached to the liquid crystal display panel via the support. A gap is formed between the microlens array and the optical film; at least one vent hole connecting a space outside the support and the gap is formed in the support; and, when seen perpendicularly with respect to the plane of the liquid crystal display panel, the vent hole extends in a bending manner or the vent hole extends in an oblique direction with respect to an inner face of the support.

18 Claims, 6 Drawing Sheets

U.S. PATENT DOCUMENTS

| | | |
|---|---|---|
| 4,368,523 A | 1/1983 | Kawate |
| 4,889,412 A | 12/1989 | Clerc et al. |
| 4,955,698 A | 9/1990 | Knoll et al. |
| 5,132,819 A | 7/1992 | Noriyama et al. |
| 5,164,851 A | 11/1992 | Kanemori et al. |
| 5,179,456 A | 1/1993 | Aizawa et al. |
| 5,182,664 A | 1/1993 | Clerc |
| 5,245,450 A | 9/1993 | Ukai et al. |
| 5,260,818 A | 11/1993 | Wu |
| 5,289,174 A | 2/1994 | Suzuki |
| 5,309,264 A | 5/1994 | Lien et al. |
| 5,331,447 A | 7/1994 | Someya et al. |
| 5,363,294 A | 11/1994 | Yamamoto et al. |
| 5,408,345 A | 4/1995 | Mitsui et al. |
| 5,434,687 A | 7/1995 | Kawata et al. |
| 5,477,358 A | 12/1995 | Rosenblatt et al. |
| 5,508,834 A | 4/1996 | Yamada et al. |
| 5,512,336 A | 4/1996 | Yamahara |
| 5,558,927 A | 9/1996 | Aruga et al. |
| 5,594,570 A | 1/1997 | Hirata et al. |
| 5,602,662 A | 2/1997 | Rosenblatt et al. |
| 5,608,556 A | 3/1997 | Koma |
| 5,636,043 A | 6/1997 | Uemura et al. |
| 5,646,702 A | 7/1997 | Akinwande et al. |
| 5,666,179 A | 9/1997 | Koma |
| 5,668,651 A | 9/1997 | Yamada et al. |
| 5,673,092 A | 9/1997 | Horie et al. |
| 5,699,137 A | 12/1997 | Kishimoto |
| 5,726,728 A | 3/1998 | Kondo et al. |
| 5,748,276 A | 5/1998 | Uno et al. |
| 5,753,093 A | 5/1998 | Raguse et al. |
| 5,811,835 A | 9/1998 | Seiki et al. |
| 5,995,176 A | 11/1999 | Sibahara |
| 6,031,591 A * | 2/2000 | Hamanaka ............... 349/95 |
| 6,061,117 A | 5/2000 | Horie et al. |
| 6,069,740 A * | 5/2000 | Hamanaka ............... 359/620 |
| 6,097,464 A | 8/2000 | Liu |
| 6,129,439 A | 10/2000 | Hou et al. |
| 6,141,077 A | 10/2000 | Hirata et al. |
| 6,169,593 B1 | 1/2001 | Kanaya et al. |
| 6,175,398 B1 | 1/2001 | Yamada et al. |
| 6,195,140 B1 | 2/2001 | Kubo et al. |
| 6,201,592 B1 | 3/2001 | Terashita et al. |
| 6,208,395 B1 | 3/2001 | Kanoh et al. |
| 6,222,599 B1 | 4/2001 | Yoshida et al. |
| 6,256,082 B1 | 7/2001 | Suzuki et al. |
| 6,266,122 B1 | 7/2001 | Kishimoto et al. |
| 6,287,649 B1 | 9/2001 | Fukushima et al. |
| 6,287,899 B1 | 9/2001 | Park et al. |
| 6,330,047 B1 | 12/2001 | Kubo et al. |
| 6,335,780 B1 | 1/2002 | Kurihara et al. |
| 6,339,462 B1 | 1/2002 | Kishimoto et al. |
| 6,340,998 B1 | 1/2002 | Kim et al. |
| 6,341,002 B1 | 1/2002 | Shimizu et al. |
| 6,342,938 B1 | 1/2002 | Song et al. |
| 6,384,887 B1 | 5/2002 | Yasuda et al. |
| 6,384,889 B1 | 5/2002 | Miyachi et al. |
| 6,504,592 B1 | 1/2003 | Takatori et al. |
| 6,512,564 B1 | 1/2003 | Yoshida et al. |
| 6,542,212 B2 | 4/2003 | Yoshida et al. |
| 6,567,144 B1 | 5/2003 | Kim et al. |
| 6,573,964 B1 | 6/2003 | Takizawa et al. |
| 6,573,965 B1 | 6/2003 | Liu et al. |
| 6,577,366 B1 | 6/2003 | Kim et al. |
| 6,593,982 B2 | 7/2003 | Yoon et al. |
| 6,600,539 B2 | 7/2003 | Song |
| 6,614,497 B2 | 9/2003 | Yamada |
| 6,630,975 B1 | 10/2003 | Terashita |
| 6,657,695 B1 | 12/2003 | Song et al. |
| 6,661,488 B1 | 12/2003 | Takeda et al. |
| 6,710,825 B2 | 3/2004 | Kubo et al. |
| 6,717,642 B2 | 4/2004 | Sasaki et al. |
| 6,771,346 B2 | 8/2004 | Sugimoto et al. |
| 6,784,961 B2 | 8/2004 | Suzuki et al. |
| 6,788,375 B2 | 9/2004 | Ogishima et al. |
| 6,812,986 B2 | 11/2004 | Takatori et al. |
| 6,822,723 B2 | 11/2004 | Song et al. |
| 6,829,026 B2 | 12/2004 | Sasaki et al. |
| 6,839,107 B2 | 1/2005 | Kobashi |
| 6,839,108 B1 | 1/2005 | Hirakata et al. |
| 6,862,062 B2 | 3/2005 | Kubo et al. |
| 6,873,384 B2 | 3/2005 | Yamanaka et al. |
| 6,894,840 B2 | 5/2005 | Yamanaka et al. |
| 6,924,856 B2 * | 8/2005 | Okumura et al. ............... 349/96 |
| 6,924,876 B2 | 8/2005 | Kubo et al. |
| 6,950,160 B2 | 9/2005 | Kubo et al. |
| 6,965,422 B2 | 11/2005 | Kubo et al. |
| 6,967,702 B2 | 11/2005 | Ishii et al. |
| 6,989,874 B2 | 1/2006 | Chae |
| 6,995,826 B2 | 2/2006 | Kubo et al. |
| 7,084,943 B2 | 8/2006 | Kubo et al. |
| 7,139,055 B2 | 11/2006 | Ogishima et al. |
| 7,145,624 B2 | 12/2006 | Kubo et al. |
| 7,202,923 B2 | 4/2007 | Yamabuchi et al. |
| 7,215,395 B2 | 5/2007 | Kubo et al. |
| 7,230,664 B2 | 6/2007 | Kubo et al. |
| 7,253,872 B2 | 8/2007 | Kume et al. |
| 7,277,146 B2 | 10/2007 | Maeda |
| 7,292,300 B2 | 11/2007 | Kubo et al. |
| 7,375,781 B2 | 5/2008 | Kubo |
| 7,379,137 B2 | 5/2008 | Kubo |
| 7,391,489 B2 | 6/2008 | Kume et al. |
| 7,499,136 B2 | 3/2009 | Kubo |
| 7,505,102 B2 | 3/2009 | Kubo et al. |
| 7,525,614 B2 | 4/2009 | Jeong et al. |
| 7,532,291 B2 | 5/2009 | Kubo et al. |
| 7,554,631 B2 | 6/2009 | Tashiro et al. |
| 7,583,332 B2 * | 9/2009 | Lee ............................ 349/68 |
| 2001/0033353 A1 | 10/2001 | Shimoshikiryo |
| 2002/0022364 A1 | 2/2002 | Hatta et al. |
| 2002/0036740 A1 | 3/2002 | Kubo et al. |
| 2002/0054269 A1 | 5/2002 | Maeda et al. |
| 2002/0060764 A1 | 5/2002 | Taniguchi et al. |
| 2002/0063834 A1 | 5/2002 | Sawasaki et al. |
| 2002/0075436 A1 | 6/2002 | Kubo et al. |
| 2002/0080320 A1 | 6/2002 | Suzuki et al. |
| 2002/0149728 A1 | 10/2002 | Ogishima et al. |
| 2002/0159012 A1 | 10/2002 | Yamada |
| 2002/0171792 A1 | 11/2002 | Kubota et al. |
| 2002/0191128 A1 | 12/2002 | Okumura et al. |
| 2003/0089949 A1 | 5/2003 | Lin et al. |
| 2003/0112213 A1 | 6/2003 | Noguchi et al. |
| 2003/0186478 A1 | 10/2003 | Morita et al. |
| 2003/0202144 A1 | 10/2003 | Kim et al. |
| 2003/0227429 A1 | 12/2003 | Shimoshikiryo |
| 2003/0231267 A1 | 12/2003 | Murai et al. |
| 2004/0027702 A1 | 2/2004 | Matsushita et al. |
| 2004/0070714 A1 | 4/2004 | Ishii et al. |
| 2004/0135949 A1 | 7/2004 | Maeda |
| 2004/0225312 A1 | 11/2004 | Orloff et al. |
| 2005/0030458 A1 | 2/2005 | Sasabayashi et al. |
| 2005/0041186 A1 | 2/2005 | Shimoshikiryo |
| 2005/0056127 A1 | 3/2005 | Yamabuchi et al. |
| 2005/0078251 A1 | 4/2005 | Chen et al. |
| 2005/0122452 A1 | 6/2005 | Yoshida et al. |
| 2005/0140876 A1 | 6/2005 | Kubo |
| 2005/0168674 A1 | 8/2005 | Kubo |
| 2005/0190322 A1 | 9/2005 | Okabe et al. |
| 2005/0205870 A1 | 9/2005 | Yamazaki |
| 2005/0213008 A1 | 9/2005 | Kubo et al. |
| 2005/0237463 A1 | 10/2005 | Kubo |
| 2005/0270447 A1 | 12/2005 | Tasaka et al. |
| 2005/0270462 A1 | 12/2005 | Koma |
| 2005/0280754 A1 | 12/2005 | Kume et al. |
| 2006/0055852 A1 | 3/2006 | Yoshida et al. |
| 2006/0061708 A1 | 3/2006 | Umebayashi et al. |
| 2006/0119776 A1 | 6/2006 | Kubo et al. |
| 2006/0139541 A1 | 6/2006 | Yamaguchi et al. |
| 2006/0139758 A1 | 6/2006 | Segawa et al. |
| 2006/0158574 A1 | 7/2006 | Kubo et al. |
| 2006/0278874 A1 | 12/2006 | Kubo et al. |
| 2006/0291065 A1 | 12/2006 | Hasei et al. |
| 2007/0019132 A1 | 1/2007 | Kim et al. |
| 2007/0097293 A1 | 5/2007 | Nakanishi et al. |
| 2007/0139594 A1 | 6/2007 | Kubo et al. |
| 2007/0146591 A1 | 6/2007 | Kimura et al. |
| 2007/0199504 A1 | 8/2007 | Nakamura et al. |

| | | | |
|---|---|---|---|
| 2007/0216827 A1 | 9/2007 | Okada et al. | |
| 2008/0002079 A1 | 1/2008 | Kimura | |
| 2008/0266499 A1 | 10/2008 | Kubo | |
| 2009/0185119 A1 | 7/2009 | Kikuchi et al. | |
| 2009/0195740 A1 | 8/2009 | Imai et al. | |
| 2009/0195741 A1 | 8/2009 | Hara et al. | |
| 2010/0007815 A1 | 1/2010 | Kosegawa et al. | |
| 2010/0014031 A1 | 1/2010 | Kikuchi et al. | |
| 2010/0020263 A1 | 1/2010 | Murao et al. | |
| 2010/0039583 A1 | 2/2010 | Usukura | |
| 2010/0045885 A1 | 2/2010 | Imai et al. | |
| 2010/0045917 A1 | 2/2010 | Imai et al. | |
| 2010/0053517 A1 | 3/2010 | Imai et al. | |
| 2010/0060813 A1 | 3/2010 | Kawashima et al. | |
| 2010/0110352 A1 | 5/2010 | Saitoh et al. | |
| 2010/0118227 A1 | 5/2010 | Shibata et al. | |
| 2010/0118238 A1 | 5/2010 | Shimada et al. | |

FOREIGN PATENT DOCUMENTS

| | | |
|---|---|---|
| EP | 0 645 661 A1 | 3/1995 |
| EP | 0 884 626 A2 | 12/1998 |
| EP | 1 701 202 A1 | 9/2006 |
| JP | 63-21907 B2 | 5/1988 |
| JP | 63-296004 | 12/1988 |
| JP | 1-129234 | 5/1989 |
| JP | 02-149802 | 6/1990 |
| JP | 03-209440 | 9/1991 |
| JP | 04-139402 | 5/1992 |
| JP | 04-293018 | 10/1992 |
| JP | 04-318816 | 11/1992 |
| JP | 4-372934 | 12/1992 |
| JP | 05-188364 | 7/1993 |
| JP | 05-289108 | 11/1993 |
| JP | 5-333328 | 12/1993 |
| JP | 06-034966 | 2/1994 |
| JP | 06-043461 | 2/1994 |
| JP | 6-75238 A | 3/1994 |
| JP | 06-118909 | 4/1994 |
| JP | 6-301036 | 10/1994 |
| JP | 6-331831 | 12/1994 |
| JP | 07-027913 | 1/1995 |
| JP | 07-036058 | 2/1995 |
| JP | 07-234400 | 9/1995 |
| JP | 7-281176 A | 10/1995 |
| JP | 07-311383 | 11/1995 |
| JP | 08-148254 | 6/1996 |
| JP | 8-190089 | 7/1996 |
| JP | 08-292423 | 11/1996 |
| JP | 9-54318 A | 2/1997 |
| JP | 09-258266 | 10/1997 |
| JP | 09-269509 | 10/1997 |
| JP | 10-186330 A | 7/1998 |
| JP | 10-301114 A | 11/1998 |
| JP | 10-325953 | 12/1998 |
| JP | 11-095197 | 4/1999 |
| JP | 11-109390 | 4/1999 |
| JP | 11-109417 A | 4/1999 |
| JP | 11-237625 A | 8/1999 |
| JP | 11-242225 A | 9/1999 |
| JP | 11-295697 | 10/1999 |
| JP | 11-337961 | 12/1999 |
| JP | 2000-010124 | 1/2000 |
| JP | 2000-47217 | 2/2000 |
| JP | 2000-47253 | 2/2000 |
| JP | 2000-075296 | 3/2000 |
| JP | 2000-249807 | 9/2000 |
| JP | 2000-305110 | 11/2000 |
| JP | 2000-329906 | 11/2000 |
| JP | 2001-021862 A | 1/2001 |
| JP | 2001-201619 | 7/2001 |
| JP | 2001-337323 | 12/2001 |
| JP | 2001-343647 A | 12/2001 |
| JP | 2002-055343 A | 2/2002 |
| JP | 2002-236283 | 8/2002 |
| JP | 2003-035824 | 2/2003 |
| JP | 2003-43525 A | 2/2003 |
| JP | 2003-270636 | 9/2003 |
| JP | 2003-280548 | 10/2003 |
| JP | 2003-297850 A | 10/2003 |
| JP | 2003-315803 | 11/2003 |
| JP | 2003-337207 | 11/2003 |
| JP | 2004-258366 | 9/2004 |
| JP | 2004-264653 | 9/2004 |
| JP | 2004-325503 | 11/2004 |
| JP | 2005-128082 | 5/2005 |
| JP | 2005-157105 A | 6/2005 |
| JP | 2005-195733 | 7/2005 |
| JP | 2005-208553 | 8/2005 |
| JP | 2005-221639 | 8/2005 |
| JP | 2005-266370 | 9/2005 |
| JP | 2005-313638 | 11/2005 |
| JP | 2006-091229 | 4/2006 |
| JP | 2006-098525 A | 4/2006 |
| JP | 2006-184673 | 7/2006 |
| JP | 2006-220711 | 8/2006 |
| JP | 2006-220922 | 8/2006 |
| JP | 2006-293410 | 10/2006 |
| JP | 2007-101843 | 4/2007 |
| JP | 2007-133037 | 5/2007 |
| JP | 2007-329099 | 12/2007 |
| JP | 2008-242307 A | 10/2008 |
| KR | 1999-0048949 | 7/1999 |
| KR | 2003-058012 A | 7/2003 |
| KR | 2003-058140 A | 7/2003 |
| WO | 00/22677 | 4/2000 |

OTHER PUBLICATIONS

Kalantar, "Viewing Angle Control Using Optical Microstructures on Light-Guide Plate for Illumination System of Mobile Transmissive LCD Module", *IDW'02*, pp. 549-552.

Funamoto et al, "Prism-sheetless High Bright Back0light System for Mobile Phone", *IDW'04*, pp. 687-690.

International Preliminary Report on Patentability mailed Mar. 26, 2009 in corresponding PCT Application No. PCT/JP2007/064448.

International Preliminary Report on Patentability mailed Apr. 9, 2009 in PCT Application No. PCT/JP2007/066658.

International Preliminary Report on Patentability mailed Apr. 9, 2009 in PCT Application No. PCT/JP2007/064447.

U.S. Appl. No. 12/442,218, filed Mar. 20, 2009, entitled "Liquid Crystal Display Panel Provided with Microlens Array, Method for Manufacturing the Liquid Crystal Display Panel, and Liquid Crystal Display Device".

U.S. Appl. No. 12/443,015, filed Mar. 26, 2009, entitled "Liquid Crystal Display Panel with Microlens Array, Its Manufacturing Method, and Liquid Crystal Display Device".

U.S. Appl. 12/522,448, filed Jul. 8, 2009, entitled "Liquid Crystal Display Panel with Micro-Lens Array and Liquid Crystal Display Device".

Suqita et al, "Brightness Enhancement in Transflective LCD by Concentration of Uniaxially Collimated Light with a Micro-Lenticular Lens", , IDW 2007, pp. 1515-1518.

U.S. Appl. No. 12/593,403, filed Sep. 28, 2009, entitled "Liquid Crystal Display Panel with Microlens Array and Method for Manufacturing the Same".

Office Action mailed Jun. 23, 2010 in related U.S. Appl. No. 11/997,563 (9 pages).

International Search Report for PCT/JP2006/315142 mailed Aug. 22, 2006.

U.S. Appl. No. 12/666,461, filed Dec. 23, 2009, entitled "Liquid Crystal Display Device and Method of Manufacturing Liquid Crystal Display Device", not yet published.

U.S. Appl. No. 12/446,099, filed Apr. 17, 2009, entitled "Liquid Crystal Display Device and Method of Manufacturing Liquid Crystal Display Device", not yet published.

U.S. Appl. No. 12/446,071, filed Apr. 17, 2009, entitled "Liquid Crystal Display and Method of Manufacturing Liquid Crystal Display", not yet published.

U.S. Appl. No. 12/664,983, filed Dec. 16, 2009, entitled "Liquid Crystal Display Device", not yet published.

English translation of the International Preliminary Report on Patentability mailed Feb. 14, 2008 in PCT Application No. PCT/JP2006/315142.

KR Notice of Reasons for Rejection and English translation thereof mailed Apr. 25, 2006 in Korean application No. 10-2004-0110955.

Kubo et al., "Development of High-Performance ASV-LCDs Using Continuous Pinwheel Alignment (CPA) Mode", pp. 1-5, Jun. 7, 2001.

EP Supplementary Search Report mailed Dec. 17, 2009 in EP application 07791179.0.

EP Supplementary Search Report mailed Dec. 29, 2009 in EP application 07806137.1.

International Search Report for PCT/JP2007/066658, mailed Dec. 4, 2007.

International Search Report for PCT/JP2007/073231, mailed Feb. 12, 2008.

U.S. Appl. No. 11/997,563, filed Feb. 1, 2008, naming Masumi Kubo, as inventor.

U.S. Appl. No. 12/293,895, filed Sep. 22, 2008, naming Masaaki Saitoh et al., as inventors.

International Search Report for PCT/JP2007/053037, mailed Mar. 27, 2007.

English translation of the International Preliminary Report on Patentability mailed Oct. 30, 2008 in corresponding PCT Application No. PCT/JP2007/053037.

Jisaki et al, "Development of transflective LCD for high contrast and wide viewing angle by using homeotropic alignment", Asia Display/IDW '01, pp. 133-136.

Jignesh Gandhi et al., "Performance Enhancement of reflective CMOS Twistes Nematic Disp Projection Using Compensating Films", pp. 1-6, reprinted from http://www/hanoah.com/publications/sid99 paper Jignesh final pdf. (1999).

Thomson-CSFILR-Jan. 2000, Optical compensation for displays (2pgs).

U.S. Office Action mailed Nov. 14, 2008 in co-pending U.S. Appl. No. 12/081,752.

U.S. Office Action mailed Apr. 30, 2009 in co-pending U.S. Appl. No. 12/081,752.

International Search Report for PCT/JP2007/070907, mailed Nov. 20, 2007.

English translation of International Preliminary Report on Patentability mailed Jul. 14, 2009 in corresponding PCT Application No. PCT/JP2007/070907.

International Search Report for PCT/JP2007/074635, mailed Jan. 29, 2008.

International Search Report for PCT/JP2008/001350, mailed Jul. 1, 2008.

International Search Report for PCT/JP2007/064447, mailed Aug. 21, 2007.

U.S. Appl. No. 12/081,752, filed Apr. 21, 2008, entitled Liquid Crystal Display Device; Inventor: Masumi Kubo.

U.S. Office Action mailed Jul. 29, 2010 in related U.S. Appl. No. 12/293,895.

Office Action mailed Feb. 17, 2011 in related U.S. Appl. No. 12/442,218 (18pgs).

"Final" Office Action mailed Sep. 21, 2011 from U.S. Appl. No. 12/442,218; Murao.

Notice of Allowance mailed Aug. 29, 2011 from U.S. Appl. No. 12/519,447; Kawashima.

* cited by examiner (a)

(b)

(a)

(b)

(c)

(a)

(b)

(c)

(d)

(e)

LIQUID CRYSTAL DISPLAY PANEL PROVIDED WITH MICROLENS ARRAY, METHOD FOR MANUFACTURING THE LIQUID CRYSTAL DISPLAY PANEL, AND LIQUID CRYSTAL DISPLAY DEVICE

This application is the U.S. national phase of International Application No. PCT/JP2007/064448 filed 23 Jul. 2007 which designated the U.S. and claims priority to Japanese Patent Application No. 2006-247135 filed 12 Sep. 2006, the entire contents of each of which are hereby incorporated by reference.

TECHNICAL FIELD

The present invention relates to a liquid crystal display panel and a liquid crystal display device, and more particularly to a liquid crystal display panel and a liquid crystal display device which include a microlens array.

BACKGROUND ART

In recent years, liquid crystal display devices are widely used as display devices for monitors, projectors, mobile information terminals, mobile phones, and the like. Generally speaking, a liquid crystal display device allows the transmittance (or reflectance) of a liquid crystal display panel to vary with a driving signal, thus modulating the intensity of light from a light source for irradiating the liquid crystal display panel, whereby images and text characters are displayed. Liquid crystal display devices include direct-viewing type display devices in which images or the like that are displayed on the liquid crystal display panel are directly viewed, projection-type display devices (projectors) in which images or the like that are displayed on the display panel are projected onto a screen through a projection lens in an enlarged size, and so on.

By applying a driving voltage which corresponds to an image signal to each of the pixels that are in a regular matrix arrangement, a liquid crystal display device causes a change in the optical characteristics of a liquid crystal layer in each pixel, and regulates the transmitted light in accordance with the optical characteristics of the liquid crystal layer with polarizers (which typically are polarizing plates) being disposed at the front and rear thereof, thereby displaying images, text characters, and the like. In the case of a direct-viewing type liquid crystal display device, usually, these polarizing plates are directly attached to a light-entering substrate (the rear substrate) and a light-outgoing substrate (the front substrate or viewer-side substrate) of the liquid crystal display panel.

Methods for applying an independent driving voltage for each pixel include a passive matrix type and an active matrix type. Among these, on a liquid crystal display panel of the active matrix type, switching elements and wiring lines for supplying driving voltages to the pixel electrodes need to be provided. As switching elements, non-linear 2-terminal devices such as MIM (metal-insulator-metal) devices and 3-terminal devices such as TFT (thin film transistor) devices are in use.

On the other hand, in a liquid crystal display device of the active matrix type, when strong light enters a switching element (in particular a TFT) which is provided on the display panel, its element resistance in an OFF state is decreased, thereby allowing the electric charge which was charged to the pixel capacitor under an applied voltage to be discharged, such that a predetermined displaying state cannot be obtained. Thus, there is a problem of light leakage even in a black state, thus resulting in a decreased contrast ratio.

Therefore, in a liquid crystal display panel of the active matrix type, in order to prevent light from entering the TFTs (in particular channel regions), a light shielding layer (called a black matrix) is provided on a TFT substrate on which the TFTs and the pixel electrodes are provided, or on a counter substrate that opposes the TFT substrate via the liquid crystal layer, for example.

Now, in the case where the liquid crystal display device is a reflection-type liquid crystal display device, decrease in the effective pixel area can be prevented by utilizing reflection electrodes as a light shielding layer. However, in a liquid crystal display device which performs displaying by utilizing transmitted light, providing a light shielding layer in addition to the TFTs, gate bus lines, and source bus lines, which do not transmit light, will allow the effective pixel area to be decreased, thus resulting in a decrease in the ratio of the effective pixel area to the total area of the displaying region, i.e., the aperture ratio.

Liquid crystal display devices are characterized by their light weight, thinness, and low power consumption, and therefore are widely used as display devices of mobile devices such as mobile phones and mobile information terminals. With a view to increasing the amount of displayed information, improving the image quality, and so on, there are stronger and stronger desires for display devices to have higher resolutions. Conventionally, it has been a standard to adopt QVGA displaying by 240×320 pixels for liquid crystal display devices of the 2 to 3-inch class, for example, but devices which perform VGA displaying by 480×640 pixels have also been produced in the recent years.

As liquid crystal display panels become higher in resolution and smaller in size, the aforementioned decrease in their aperture ratio presents a greater problem. The reason is that, even if there is a desire to reduce the pixel pitch, constraints such as electrical performance and fabrication techniques make it impossible for the TFTs, the bus lines, etc., to become smaller than certain sizes. It might be possible to enhance the brightness of the backlight in order to compensate for the decreased transmittance, but this will induce an increased power consumption, thus presenting a particular problem to mobile devices.

In recent years, as display devices of mobile devices, transflective-type liquid crystal display devices have become prevalent, which perform displaying under dark lighting by utilizing light from a backlight, and which perform displaying under bright lighting by reflecting light entering the display surface of the liquid crystal display panel. In a transflective-type liquid crystal display device, a region (reflection region) which performs displaying in the reflection mode and a region (transmission region) which performs displaying in the transmission mode are included in each pixel. Therefore, reducing the pixel pitch significantly will lower the ratio of the area of the transmission region to the total area of the displaying region (aperture ratio of the transmission region). Thus, although transflective-type liquid crystal display devices have the advantage of realizing displaying with a high contrast ratio irrespective of the ambient brightness, they have a problem in that their brightness is lowered as the aperture ratio of the transmission region becomes smaller.

As a method for improving the efficiency of light utility of such a liquid crystal display device including transmission regions, Patent Document 1, Patent Document 2, and Patent Document 3 disclose a method of providing a microlens array for converging light in each pixel on the liquid crystal display panel in order to improve the effective aperture ratio of the liquid crystal display panel. Furthermore, the applicant discloses in Patent Document 4 a production method for a liquid crystal display panel with a microlens array, which is suitably used for transmission-type or transflective-type liquid crystal display devices and the like. According to the production method described in Patent Document 4, microlenses can be formed within a pixel in a self-aligning manner, with a high positional precision.

[Patent Document 1] Japanese Laid-Open Patent Publication No. 2000-329906
[Patent Document 2] Japanese Laid-Open Patent Publication No. 2005-195733
[Patent Document 3] Japanese Laid-Open Patent Publication No. 2005-208553
[Patent Document 4] Japanese Laid-Open Patent Publication No. 2005-196139

DISCLOSURE OF INVENTION

Problems to be Solved by the Invention

In a liquid crystal display device having a microlens array, an optical film such as a polarizing plate is attached on the convex surfaces of the microlenses. There has been a problem in that, when the optical film is attached only via the microlenses, the optical film will only be in contact with the neighborhoods of the apices of the convex surfaces, so that the contact area between the optical film and the microlenses will be small, thus rendering the optical film easy to peel. As another problem, the fact that the ends of the optical film are not in contact with the microlens, but are free, renders the optical film even easier to peel.

As an idea for solving this problem, as described in Patent Document 1, it may be conceivable to entirely bury the gaps between the microlens array and the optical film with an adhesive. In this case, in order to obtain significant convergence characteristics with the microlenses, it is necessary to employ a material with a refractive index which is lower than that of the material of the microlenses as an adhesive. However, it has been found that, as such low-refractive index materials, only those materials whose refractive index is about 1.40 exist in actuality.

As the material of microlenses, a resin having a refractive index of about 1.60 is usually used. Therefore, when a material whose refractive index is about 1.40 is disposed between the microlenses and the cover glass, the refractive index difference between them will be only about 0.20, so that not such great convergence characteristics can be obtained. Therefore, although a material whose refractive index is about 1.40 may be applicable to a liquid crystal display device which allows microlenses with a relatively long focal length to be used, e.g., a projection-type liquid crystal display device, it is difficult to be used for a thin direct-viewing type liquid crystal display device which requires microlenses with a short focal length, because a sufficient convergence ability will not be obtained.

On the other hand, in the liquid crystal display devices described in Patent Documents 2 and 3, protrusions (terraces) which are at the same height as or higher than the microlenses is provided in the neighborhood of the microlens array, and the optical film is attached to these protrusions by using an adhesive. The gap between the periphery (the region other than the apex portion) of each microlens and the optical film is filled with air. Based on this construction, a relatively large convergence effect is obtained in the periphery of each microlens; the attachment strength of the optical film is improved; and the optical film becomes difficult to peel.

However, it has been found that adopting this construction will result in the following problems.

Usually, attachment of the optical film is performed through autoclaving by using a pressurizing apparatus. In autoclaving, the optical film is attached at a high temperature and under a high pressure, which realizes strong adhesion in a short period of time. Moreover, autoclaving will remove the voids which are contained in the adhesive or the like, thereby enabling a stronger adhesion.

However, according to a study by the inventors, it has been found that, since a liquid crystal display device of the aforementioned construction includes gaps (sealed air layers) which are sealed by the microlenses, the optical film, and the protrusions, a temperature difference and a pressure difference occur between the gaps and the exterior of the device when autoclaving is performed, thus causing deformation and peeling of the optical film. Such deformation and peeling not only deteriorate the adhesion strength of the optical film, but also may cause display unevenness. Another problem has been found that, since temperature and pressure are difficult to be propagated to the inside of the device, the voids contained in the adhesive will not be sufficiently removed and the adhesion strength will not be enhanced.

In order to solve this problem, air holes for interconnecting the gaps and the external space may be provided in the liquid crystal display device. However, according to a study by the inventors, it has been found that merely providing air holes so as to extend perpendicularly to the inner face of the protrusions will deteriorate the adhesion strength between the optical film and the protrusions in the neighborhood of the air holes, so that the deformation and peeling problems will not be completely solved. Moreover, through such air holes, temperature and humidity of the external air will be easily propagated to the displaying region during use of the liquid crystal display device, so that condensation will occur in the displaying region to cause display unevenness. Furthermore, depending on the shape of the air holes, foreign matter may be mixed into the displaying region through the air holes, which may also cause display unevenness.

The present invention has been made in view of the aforementioned problems, and an objective thereof is to provide a liquid crystal display panel with microlenses in which deformation, peeling, and the like of an optical film are not likely to occur and which has a good displaying quality, as well as a liquid crystal display device incorporating the same.

Means for Solving the Problems

A liquid crystal display panel with a microlens array according to the present invention comprises: a liquid crystal display panel having a plurality of pixels; a microlens array provided on a light-incident side of the liquid crystal display panel; a support provided on the light-incident side of the liquid crystal display panel so as to surround the microlens array; and an optical film attached to the liquid crystal display panel via the support, wherein, a gap is formed between the microlens array and the optical film; at least one vent hole connecting a space outside the support and the gap is provided in the support; and the vent hole extends in a bending manner or extends in an oblique direction with respect to an inner face or an outer face of the support.

In one embodiment, a shape of the vent hole as seen from a direction perpendicular to the plane of the liquid crystal display panel is a crank shape or an S-shape.

In one embodiment, a cross-sectional width of the vent hole in a plane which is perpendicular to a direction that the vent hole extends is no less than 25 μm and no more than 500 μm.

In one embodiment, the support includes a first portion formed so as to surround the microlens array and a second portion provided so as to surround the first portion; and a gap which is in communication with the vent hole is formed between the first portion and the second portion.

In one embodiment, a plurality of vent holes are formed in different positions of the support.

In one embodiment, the plurality of vent holes are formed in different positions of the support at an equal interval.

In one embodiment, the plurality of vent holes are formed in different positions of the support with an interval of 1 mm or more.

In one embodiment, the support is formed at a predetermined distance from an end of the microlens array. In one embodiment, the predetermined distance is 200 μm or less. In one embodiment, the predetermined distance is no less than 50 μm and no more than 100 μm.

A liquid crystal display device according to the present invention is a liquid crystal display device having the aforementioned liquid crystal display panel with a microlens array.

A production method for a liquid crystal display panel with a microlens array according to the present invention is a production method for a liquid crystal display panel with a microlens array, the liquid crystal display panel having a liquid crystal display panel, a microlens array provided on a light-incident side of the liquid crystal display panel, and an optical film provided on a light-incident side of the microlens array, with a gap between the microlens array and the optical film, comprising: (a) a step of forming a resin layer on a face of the liquid crystal display panel; (b) a step of processing the resin layer to form a microlens array; (c) a step of processing the resin layer to form a support so as to surround the microlens array; and (d) a step of attaching an optical film to the support, wherein, in step (c), at least one vent hole connecting a space inside the support and a space outside the support is formed in the support, so as to extend in a bending manner or extend in an oblique direction with respect to an inner face of the support.

In one embodiment, the vent hole is formed in a crank shape or an S-shape as seen from a direction which is perpendicular to the plane of the liquid crystal display panel.

In one embodiment, step (c) comprises a step of forming a first portion of the support so as to surround the microlens array and a step of forming a second portion of the support so as to surround the first portion, with a gap in communication with the vent hole being formed between the first portion and the second portion.

In one embodiment, in step (c), a plurality of vent holes are formed in different positions of the support. In one embodiment, in step (c), a plurality of vent holes are formed in different positions of the support at an equal interval.

Effects of the Invention

According to the present invention, in a liquid crystal display device in which a gap is formed between a microlens array and an optical film, a vent hole is formed in the support. Therefore, distortion, warp, deformation, peeling, and the like of the optical film, which might occur during the production process of the liquid crystal display device, are prevented. Furthermore, the vent hole extends in a bending manner, or extends in an oblique direction with respect to the inner face or the outer face of the support. Therefore, portions with weak attachment strength will not localize in any portion of the support, whereby distortion, warp, deformation, peeling, and the like of the optical film can be more effectively prevented. Moreover, air will not abruptly flow in through the vent hole, so that condensation and mixing of foreign matter, which might occur during the production or use of the liquid crystal display device, can also be prevented, thereby preventing occurrence of display unevenness.

Thus, there is provided a liquid crystal display panel with microlenses as well as a liquid crystal display device having a high strength, an execute efficiency of light utility, and a high displaying quality across the entire display surface. Moreover, according to the present invention, such a liquid crystal display panel and liquid crystal display device can be produced efficiently.

Figure 1:
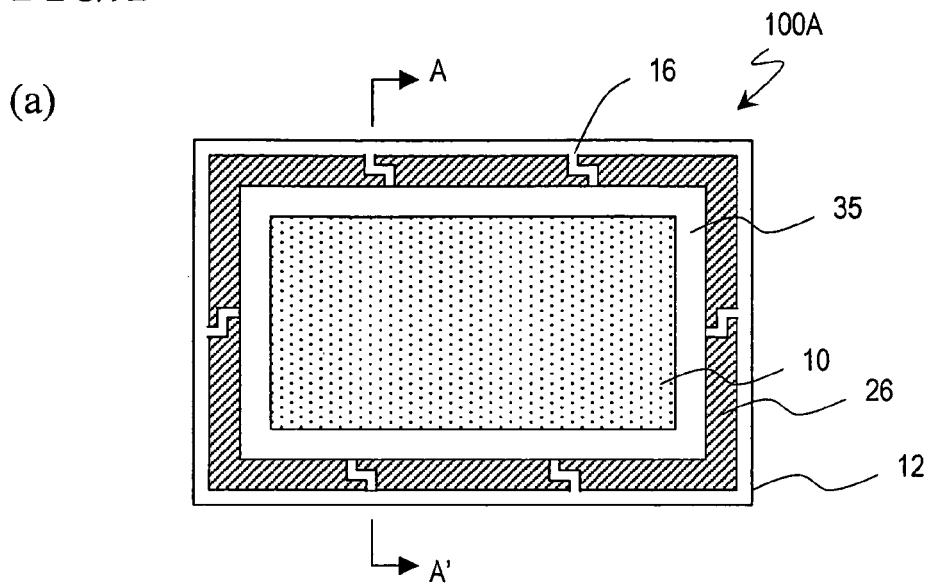
FIG. 1(*a*) is a plan view schematically showing the construction of a liquid crystal display panel with a microlens array according to an embodiment of the present invention; and (*b*) is a cross-sectional view thereof.
Figure 1:
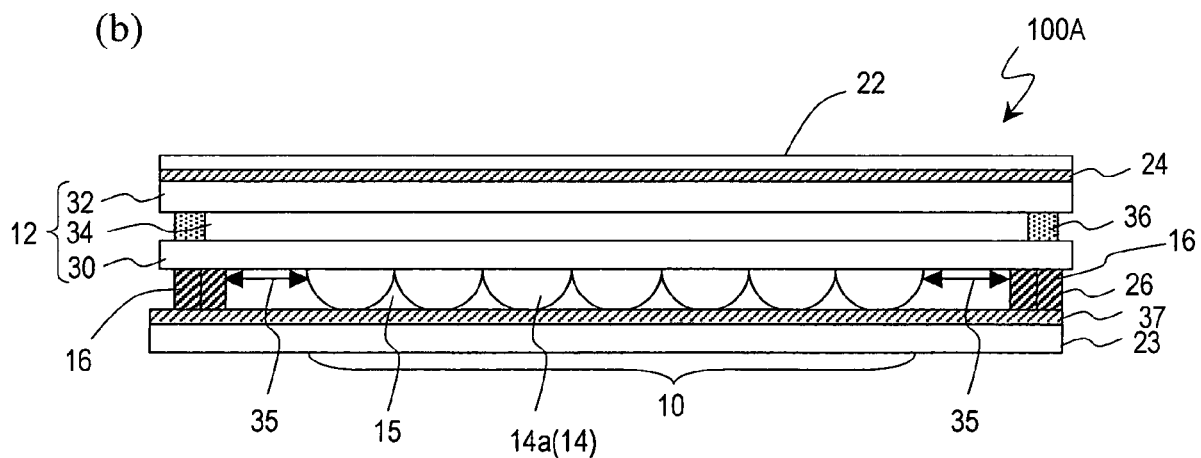

DESCRIPTION OF REFERENCE NUMERALS 10 displaying region
12 liquid crystal display panel
14 microlens array
14*a* microlens
14*a'* latent image of microlens 14*a*
15 gap
15' gap
16 vent hole
16' latent image of vent hole 16
17 pixel aperture
20 auxiliary hole
22 front-face side optical film
23 rear-face side optical film
24 adhesion layer
26 support
26' latent image of support 26
30 electrical element substrate
32 counter substrate
34 liquid crystal layer
35 peripheral region
36 sealant 37 adhesion layer
39 resin layer
40 photomask
41 backlight
42 light source
43 light guide plate
44 reflector
100A, 100B, 100C liquid crystal display panel with a microlens array
200 liquid crystal display device

BEST MODE FOR CARRYING OUT THE INVENTION

Hereinafter, with reference to the drawings, the structure of a liquid crystal display panel with a microlens array according to an embodiment of the present invention will be described.

FIG. 1 is a diagram schematically the construction of a liquid crystal display panel 100A with a microlens array according to the present embodiment (which hereinafter may be simply referred to as the liquid crystal display panel 100A). FIG. 1(a) shows a plan view of the liquid crystal display panel 100A; and FIG. 1(b) shows the construction of the liquid crystal display panel 100A along the A-A' cross section in FIG. 1(a).

As shown in the figure, the liquid crystal display panel 100A of the present embodiment includes a liquid crystal display panel (also referred to as a "liquid crystal cell") 12 having a plurality of pixels in a matrix arrangement, a microlens array 14 which is provided on the light-incident side (the lower side in FIG. 1(b)) of the liquid crystal display panel 12 and which includes a plurality of microlenses 14a, a support 26 provided in a peripheral region of the microlens array 14, a front-face side optical film 22 provided on the viewer's side of the liquid crystal display panel 12 (the upper side in FIG. 1(b)), and a rear-face side optical film 23 provided on the light-incident side of the microlens array 14. The front-face side optical film 22 and the rear-face side optical film 23 each include at least a polarization film which transmits linearly polarized light.

The microlens array 14 is provided in a displaying region 10, which is a region where pixels are formed, and is not formed in a peripheral region 35 between the displaying region 10 ad the support 26. Although the microlenses 14a of the microlens array 14 are provided so as to correspond to the respective pixels in the present embodiment, the microlens array 14 may be composed of lenticular lenses each covering a plurality of pixels. As will be described later, the support 26 is preferably made of the same material as that of the microlenses 14a, whereby the production steps can be simplified.

The liquid crystal display panel 12 includes an electrical element substrate 30 on which switching elements (e.g. TFTs or MIM devices) are provided for the respective pixels, a counter substrate 32 which is e.g. a color filter substrate (CF substrate), and a liquid crystal layer 34. The liquid crystal layer 34 includes a liquid crystal material which is filled between the electrical element substrate 30 and the counter substrate 32, and is sealed by a sealant 36 that is provided in the outer periphery.

The front-face side optical film 22 is attached to the liquid crystal display panel 12 via the adhesion layer 24, and the rear-face side optical film 23 is attached to the support 26 and the respective apex portions of the microlenses 14a via the adhesion layer 37. The adhesion layer 37 and the microlens array 14 are formed so that the adhesion layer 37 is only in contact with the neighborhood of the apices of the microlenses 14a, such that a gap 15 which is filled with air is formed between the periphery (the portion other than the apex portion) of each microlens 14a and the adhesion layer 37 and in the peripheral region 35.

As shown in FIG. 1(a), in the support 26, vent holes 16 in crank shape are formed for connecting the gaps 15 to the space outside the liquid crystal display panel 12. As will be described later, the vent holes 16 are formed according to the aperture shape of the photomask when the support 26 is formed in a photolithography step.

The width of each vent hole 16 (the width of a cross section of the vent hole 16 along a plane which is perpendicular to the direction the vent hole 16 extends) is 250 μm. Preferably, the width of each vent hole 16 is no less than 25 μm and no more than 500 μm. If the width is smaller than 25 μm, changes in external temperature or humidity will become less likely to be propagated the gaps 15 and their neighboring component parts via the vent holes 16, so that condensation will be likely to occur inside the liquid crystal display panel 100A, thus causing problems such as display unevenness. A problem is also likely to occur in that the vent holes 16 may be occluded by such condensation or foreign matter which intrudes from outside, thus hindering the function of the vent holes 16. On the other hand, if the width is greater than 500 μm, the contact area between the rear-face side optical film 23 and the support 26 will be small, so that distortion or flexing of the rear-face side optical film 23 will be likely to occur. A problem will also exist in that the adhesion substance of the adhesion layer 37 is likely to occlude the vent holes 16.

For simplicity, FIG. 1(a) illustrates the vent holes 16 as being positioned so that two vent holes 16 are formed along the two respective longer sides of the liquid crystal display panel 12, and that one vent hole 16 is formed along each shorter side. However, in an actual embodiment, the vent holes 16 are to be uniformly located at an interval of 10 mm along the direction the support 26 extends. Note that, even if one vent hole 16 is provided for one liquid crystal display panel, or if one vent hole 16 is provided in each side of the liquid crystal display panel 12, the effects of providing the vent holes 16 can be obtained. However, if the number of vent holes 16 is too large, the adhesion area between the rear-face side optical film 23 and the support 26 will be small, thus inducing problems such as deformation and peeling of the rear-face side optical film 23. Therefore, it is preferable that the vent holes 16 are provided at an interval of 1 mm or more.

Figure 2:
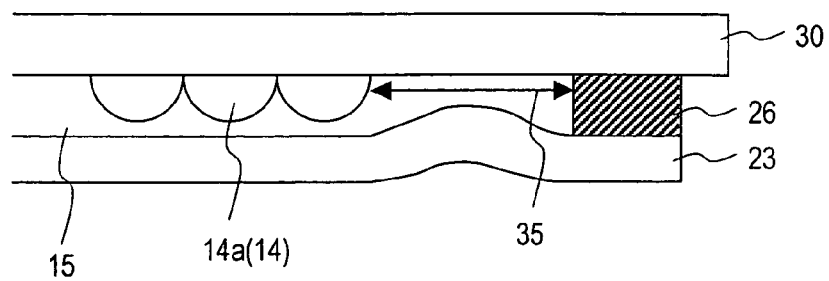
FIG. 2 A diagram, used for reference sake, for explaining an appropriate size of a peripheral region in the present embodiment.

In the present embodiment, the width of the peripheral region 35 between the end of the microlens array 14 and the support 26 (width along a direction which is perpendicular to the direction the support 26 extends) is set to 80 μm. If the width of the peripheral region 35 is greater than 200 μm, as shown in FIG. 2, flexing is likely to occur in the peripheral region 35 of the rear-face side optical film 23. When flexing occurs, display unevenness will occur near the periphery of the displaying region 10. Therefore, the width of the peripheral region 35 is preferably 200 μm or less. On the other hand, if this width is smaller than 50 μm, there will be less than a sufficient margin for misalignment when forming the microlens array 14 and the support 26. Therefore, the width of the peripheral region 35 is preferably 50 μm or more. The most preferable width of the peripheral region 35 is no less than 50 μm and no more than 100 μm.

According to the present embodiment, the vent holes 16 alleviate the temperature difference and humidity difference between the inside and the outside of the device when producing the liquid crystal display panel 100A (particularly in the step of attaching the rear-face side optical film 23 through autoclaving) or after production, thus reducing the influences on the component parts due to expansion and shrinkage of the component parts and expansion and shrinkage of the air within the gaps 15. As a result, distortion, warp, deformation, peeling, and the like of the optical film are effectively prevented.

Moreover, when the shape and positioning of the vent holes 16 according to the present embodiment are adopted, portions with weak attachment strength will not localize in any portion of the support, whereby distortion, warp, deformation, peeling, and the like of the optical film are more effectively prevented. Moreover, mixing of foreign matter into the displaying region 10 and condensation inside the displaying region 10 are prevented, thus making it possible to provide a high-quality liquid crystal display panel with little display unevenness.

In particular, since the vent holes 16 are formed in crank shape, as compared to the case where the vent holes are simply formed perpendicularly to the direction the support 26 extends, the vent holes 16 have a longer distance, and an increased resistance is provided for the air flow inside the vent holes 16. As a result, abrupt flowing in and out of air between the gaps 15 and the external space can be prevented, and mixing of foreign matter into the displaying region 10 and condensation inside the displaying region 10 are effectively prevented. Moreover, since the vent holes 16 do not extend in one line along a direction perpendicular to the inner face of the support 26, regions lacking the support 26 are not localized in one portion, whereby the adhesion strength between the support 26 and the rear-face side optical film 23 can be maintained high.

Next, with reference to FIG. 3, variants of the vent holes 16 will be described. Herein, only two vent holes 16 and the support 26 in their neighborhood are illustrated, while the other portions of the liquid crystal display panel 12 are omitted from illustration.

FIG. 3(a) shows a first variant of the vent holes 16. As shown in the figure, the vent holes 16 of the first variant extend in an S-shape, thus differing from the vent holes 16 of the above-described embodiment. However, their size and positioning, as well as the resultant effects and the like, are essentially the same as those in the above-described embodiment.

FIG. 3(b) shows a second variant of the vent holes 16. As shown in the figure, the vent holes 16 of the second variant extend in a linear shape along an oblique direction with respect to the inner face and the outer face (side faces of the liquid crystal display panel 100A) of the support 26. The size and positioning of the vent holes 16, as well as the resultant effects and the like are also essentially the same as those of the above-described embodiment.

FIG. 3(c) shows a third variant of the vent holes 16. As shown in the figure, in addition to the aforementioned crank-shape vent holes, the vent holes 16 of the third variant include an auxiliary hole 20 formed so as to extend in parallel to the support 26 (i.e., vent holes in crank-shape plus inner-moat shape). The auxiliary hole 20 is a gap that is formed between an inner portion (first portion) of the support 26 which is formed so as to surround the microlens array 14 and an outer portion (second portion) of the support 26 which is formed so as to surround the inner portion. According to the vent holes 16 of the third variant, the auxiliary hole 20 further reduces the abrupt flowing in and out of air, thereby more effectively preventing mixing of foreign matter into the displaying region 10 and condensation inside the displaying region 10.

Next, with reference to FIG. 4, a variant liquid crystal display panel 100B with a microlens array according to the present embodiment will be described. Among the constituent elements of this variant, those which are identical to the constituent elements in the embodiment shown in FIG. 1 are denoted with like reference numerals, and the descriptions thereof are omitted.

In the liquid crystal display panel 100A shown in FIG. 1, the rear-face side optical film 23 is attached to the liquid crystal display panel 12 via the neighborhood of the apices of the microlenses 14a and the support 26. In the variant liquid crystal display panel 100B with a microlens array (which hereinafter may simply be referred to as "liquid crystal display panel 100B"), as shown in FIG. 4, the rear-face side optical film 23 is attached to the liquid crystal display panel 12 only via the support 26. Therefore, a gap 15' is created between the microlens array 14 and the rear-face side optical film 23 across the entire interior of the support 26. Note that, in this case, the adhesion layer 37 is to be formed only in the neighborhood of the rear-face side optical film 23 (only in the portion opposing the support 26). Otherwise, the construction is the same as that of the liquid crystal display panel 100A.

Figure 4:
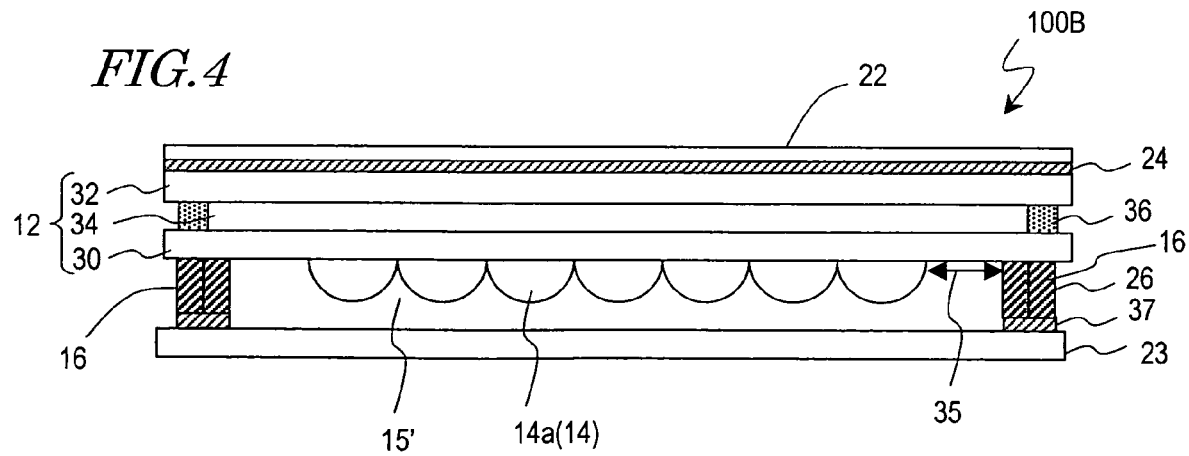
FIG. 4 A diagram showing a variant of the liquid crystal display panel with a microlens array according to the present embodiment.

The liquid crystal display panel 100B shown in FIG. 4 has a slightly inferior withstanding pressure than does the liquid crystal display panel 100A shown in FIG. 1, but the rear-face side optical film 23 or the adhesion layer 37 is not in contact with the microlenses 14a. Therefore, the microlenses 14a will not be deformed even if the liquid crystal display panel 12 is depressed, thus preventing the brightness unevenness that may be caused by deformation of the microlenses 14a. The effects which are obtained due to the presence of the vent holes 16 are the same as those obtained with the liquid crystal display panel 100A.

The liquid crystal display panel 100 with a microlens array according to the present invention is suitably applied to a liquid crystal display panel having a pixel pitch of 50 μm to 250 μm, and in particular to a liquid crystal display panel with a pixel pitch of 200 μm or less. The diameter of each microlens (a width along a direction in which its lens function is exhibited) is set substantially equal to the pixel pitch. The height of each microlens is about 10 μm to 35 μm, and is to be determined in accordance with the microlens diameter and the pixel pitch.

Next, with reference to FIGS. 5(a) to (e) and FIGS. 6(a) and (b), a preferable production method for a liquid crystal display panel with a microlens array according to the present invention will be described. Herein, FIGS. 5(a) to (e) and FIG. 6(a) show steps by which a plurality of liquid crystal display panels 100A shown FIG. 1 are formed simultaneously on a single mother substrate, whereas FIG. 6(b) shows steps by which the plurality of liquid crystal display panels 100A formed on the mother substrate are cut apart to become a plurality of liquid crystal display panels 100A which are independent from one another. Therefore, in FIGS. 5(a) to (e) and FIG. 6(a), the constituent elements of the plurality of liquid crystal display panels 100A, e.g., the electrical element substrates 30, the counter substrates 32, the optical films 22 and 23, and the like, are each shown as one continuous layer.

Figure 5:
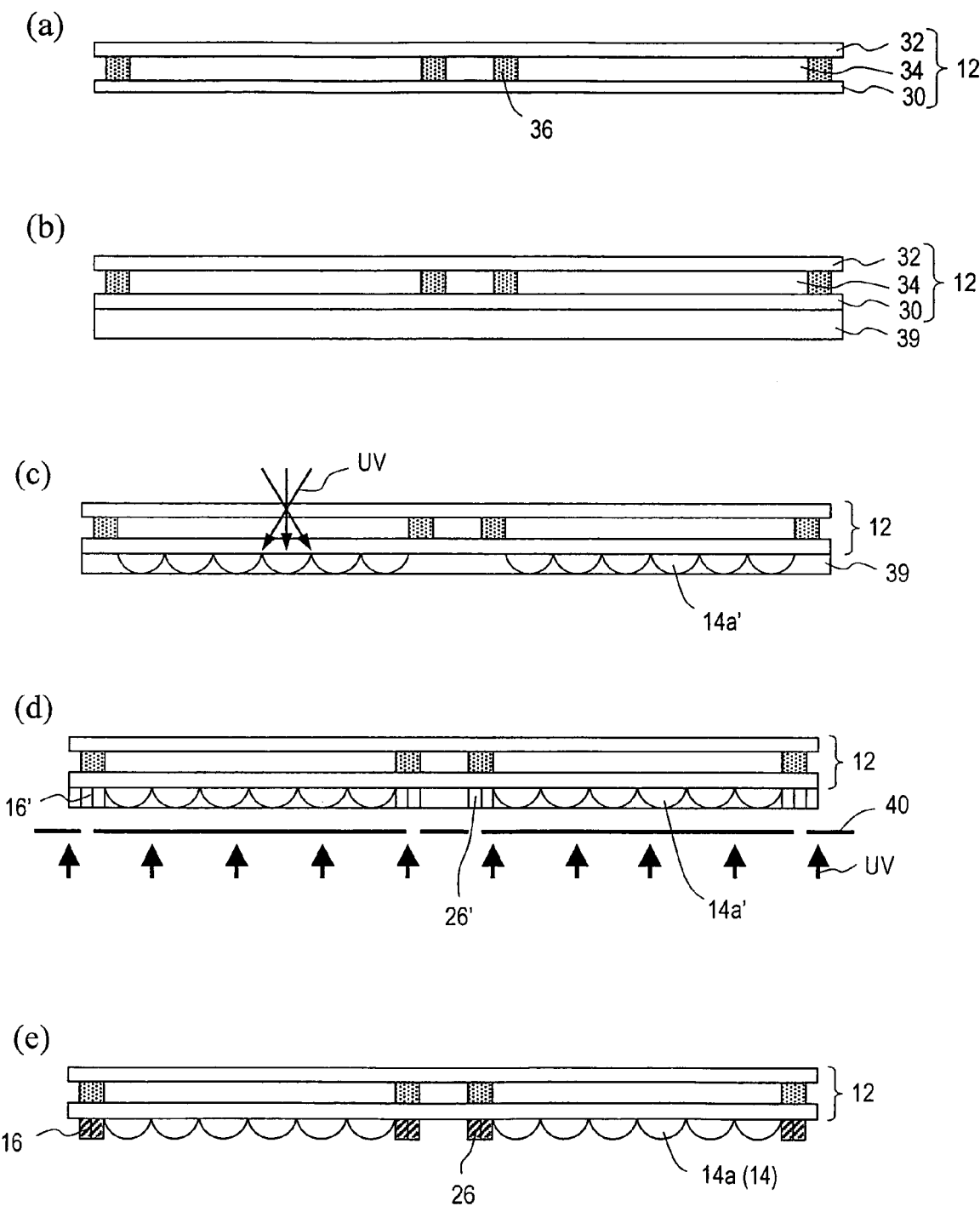
FIG. 5(*a*) to (*e*) are cross-sectional views schematically showing a former portion of a production method according to the present embodiment.
Figure 6:
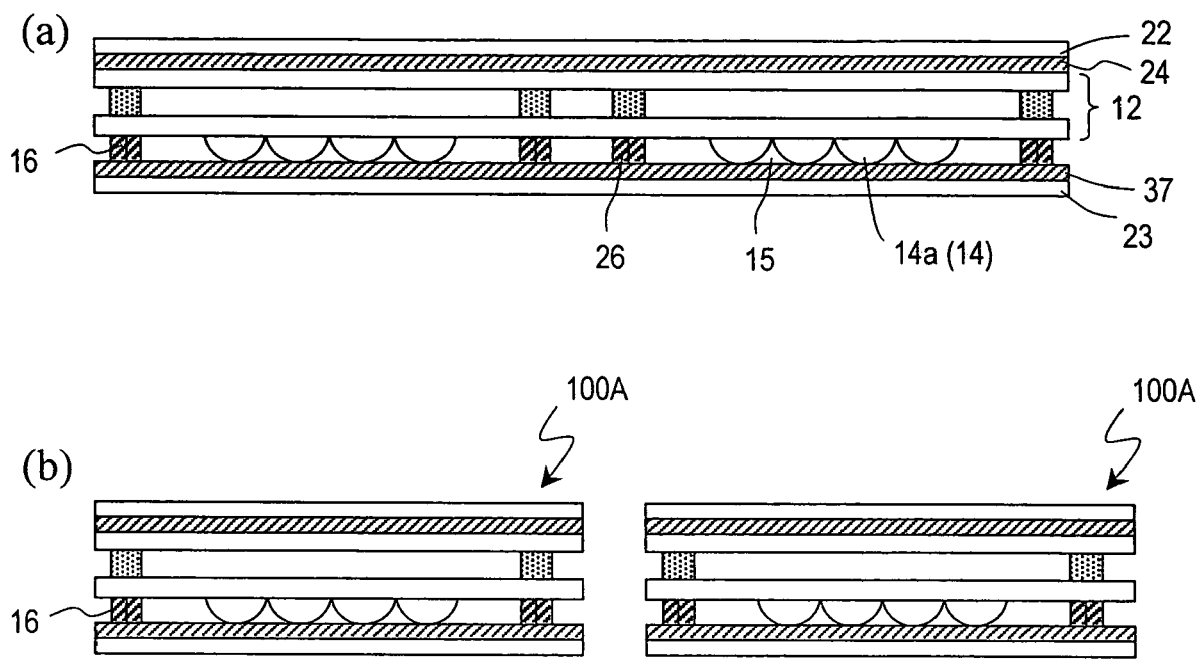
FIGS. 6(*a*) and (*b*) are cross-sectional views schematically showing a latter portion of a production method according to the present embodiment.

First, as shown in FIG. 5(a), a liquid crystal display panel 12 having a plurality of pixels in a matrix arrangement is provided. The liquid crystal display panel 12 includes an electrical element substrate 30 such as a TFT substrate, a counter substrate 32 such as a color filter substrate, and a liquid crystal layer 34 containing a liquid crystal material. The liquid crystal layer 34 is formed by using a liquid crystal dropping method, and is sealed between the electrical element substrate 30 and the counter substrate 32 with a sealant 36.

Although a liquid crystal injection method could be adopted for the formation of the liquid crystal layer 34, use of the liquid crystal dropping method will make it easy to simultaneously form a plurality of liquid crystal display panels on a mother substrate within a short period of time.

Next, as shown in FIG. 5(b), a dry film (dry film resist) is attached on one of the principal faces of the liquid crystal display panel 12, thereby forming a resin layer 39. A photo-curable resin is used as the material of the resin layer 39. Although it is preferable to use a UV-curable resin having a high transmittance for the dry film (resin layer 39), a photo-curable resin, a thermosetting resin, or a photocurable-thermosetting type resin can otherwise be used. In a subsequent step, microlenses 14a are formed by processing the resin layer 39. In order to realize a thin liquid crystal display device, it is desirable to make the thickness of the resin layer 39 as thin as possible, so long as a convergence effect is obtained with the microlenses.

Next, as shown in FIGS. 5(c) to (e), a microlens array 14 having the plurality of microlenses 14a and a support 26 are formed by processing the resin layer 39. Preferably, formation of the microlenses 14a is performed by a method in self-aligning fashion (self alignment method) as described in Patent Document 3. According to this method, microlenses 14a corresponding to the pixels can be easily formed with no misalignment of optical axes, whereby a high convergence effect can be obtained.

Based on this method, in the step shown in FIG. 5(c), the resin layer 39 of UV curable resin is irradiated with UV light through the liquid crystal display panel 12. During the UV light irradiation, the substrate or the UV light source is moved so as to change the incident angle of the irradiation light to the liquid crystal display panel 12 in a stepwise or gradual manner. As a result, the irradiation intensity of the irradiation light on the resin layer 39 is locally changed, whereby latent images 14a' of microlenses 14a corresponding to the respective pixels are formed.

Thereafter, as shown in FIG. 5(d), the resin layer 39 is exposed to light from the opposite side of the liquid crystal display panel 12 through a photomask 40, thereby forming a latent image 26' of the support 26 and latent images 16' of the vent holes 16 in a peripheral region of the microlens array 14.

By performing a development step after this exposure step, as shown in FIG. 5(e), the microlens array 14 having the plurality of microlenses 14a is formed, and also the support 26 having the vent holes 16 is formed in the peripheral region of the microlens array 14. Since the heights of the support 26 and the microlenses 14a can be defined by the thickness of the resin layer 39, a resin layer 39 having a highly uniform thickness can be obtained by using a dry film for the resin layer 39, whereby the heights of the support 26 and the microlenses 14a (maximum height) can be precisely controlled to the same height.

Thereafter, as shown in FIG. 6(a), the rear-face side optical film 23 is attached to the support 26 and the apex portions of the microlens array 14 via an adhesion layer 37, and the front-face side optical film 22 is attached to the liquid crystal display panel 12 via an adhesion layer 24. Note that the front-face side optical film 22 can be attached to the liquid crystal display panel 12 at any arbitrary point in the aforementioned steps.

Finally, as shown in FIG. 6(b), by using a method described in Japanese Laid-Open Patent Publication No. 2004-4636, for example, the multilayer substrate shown in FIG. 6(a) is cut, whereby a plurality of liquid crystal display panels 100A with microlens arrays are completed.

In the steps in FIGS. 5(c) to (e) above, the microlens array 14 and the like can be formed by a method such as a transfer technique, for example. In the case of using a transfer technique, a stamper is pressed against the resin layer 39 to transfer a template of the stamper, whereby the microlens array 14, the support 26, and the vent holes 16 are formed. As a result, a liquid crystal display panel having a similar structure to that which is shown in FIG. 5(e) is obtained.

Note that, in the case of producing the variant liquid crystal display panel 100B shown in FIG. 4, the resin layer 39 may be exposed to light so that the thickness of the apex portions of the latent images 14a' of the microlenses is thinner than the thickness of the resin layer 39, by adjusting the irradiation light in the aforementioned exposure step of FIG. 5(c).

Next, the shape of the microlenses 14a to be formed in the aforementioned steps will be described.

Figure 7:
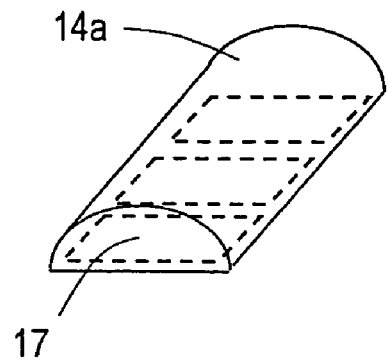
FIG. 7(*a*) to (*e*) are diagrams exemplifying microlens shapes that can be formed with a production method according to the present embodiment.
Figure 7:
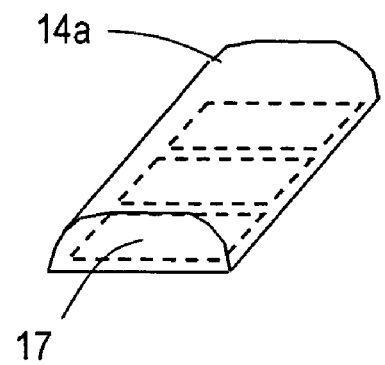
Figure 7:
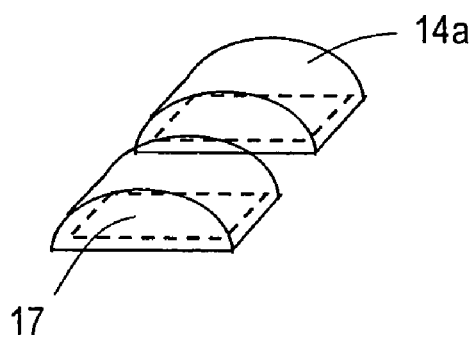
Figure 7:
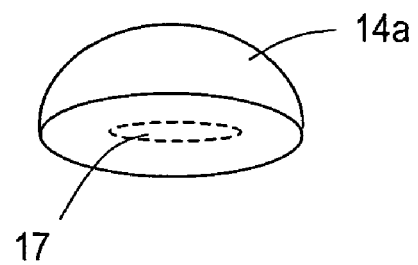
Figure 7:
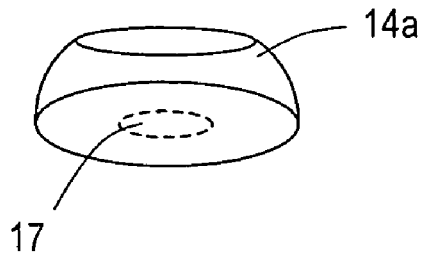

FIG. 7 is diagrams schematically exemplifying shapes of the microlenses 14a to be formed in the steps shown in FIGS. 5(c) to (e). In these steps, by adjusting the distribution of irradiation light amount for the resin layer 39, lenticular lenses each encompassing a plurality of pixel apertures 17 can be formed as shown in FIGS. 7(a) and (b), or microlens corresponding to the respective pixel apertures 17 can be formed as shown in FIGS. 7(c) to (e). The lens shown in FIG. 7(a) is a semicolumnar lenticular lens; and the lens shown in FIG. 7(b) is a lenticular lens having a flat portion in the neighborhood of its apex. The lenses shown in FIG. 7(c) are semicolumnar microlenses which are formed for the respective pixels; the lens shown in FIG. 7(d) is a hemispherical microlens which is formed for each pixel; and the lens shown in FIG. 7(e) is a hemispherical microlens whose apex portion is planarized.

In the above-described production method, the microlens array 14 is formed by exposing the resin layer 39 to light. However, the microlens array 14 and the support 26 may be integrally formed on the surface of a glass substrate of a liquid crystal display panel, as is described in U.S. Pat. No. 6,989,874, for example. A liquid crystal display panel with a microlens array which is formed with such a method is also encompassed within the scope of the present invention.

Figure 8:
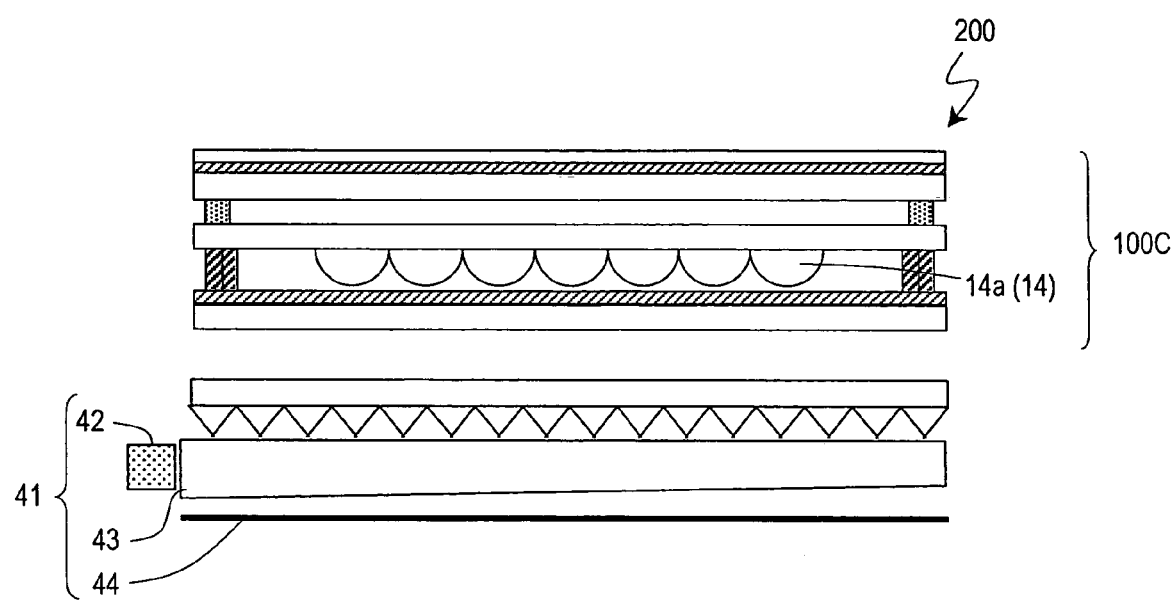
FIG. 8 A cross-sectional view schematically showing a liquid crystal display device having a liquid crystal display panel with a microlens array according to the present invention.

FIG. 8 schematically shows the construction of a liquid crystal display device 200 having a liquid crystal display panel 100C according to an embodiment of the present invention. The liquid crystal display panel 100C corresponds to the liquid crystal display panels 100A and 100B with a microlens array of the present embodiment.

The liquid crystal display device 200 includes the liquid crystal display panel 100C and a backlight 41 having high directivity. The backlight 41 includes a light source 42, a light guide plate 43 for receiving light emitted from the light source 42 and allowing it to propagate therethrough and be emitted toward the liquid crystal display panel 100C, and a reflector 44 for causing the light which is emitted from the rear face of the light guide plate 43 or light which is incident from outside of the liquid crystal display device 200 and transmitted through the liquid crystal display panel 100C and the light guide plate 43 to be reflected toward the light guide plate 43.

The backlight 41 emits light that has a low directivity along the direction in which LEDs used as the light source 42 are arranged and a high directivity along a direction which is orthogonal thereto. Note that directivity is an index indicating a degree of divergence of light from the backlight 41 (degree of parallelism), and usually an angle which results in a brightness that is half of the brightness in the frontal direction is defined as a half-directivity angle. Therefore, as this half-directivity angle becomes smaller, the backlight has more of a peak (having a high directivity) in the frontal direction.

As the backlight 41 suitable for use in the liquid crystal display device 200, for example, backlights which are described in IDW'02 "Viewing Angle Control using Optical Microstructures on Light-Guide Plate for Illumination System of Mobile Transmissive LCD Module", K. KALANTAR, p 549-552, IDW'04 "Prism-sheetless High Bright Backlight System for Mobile Phone" A. Funamoto et al. p. 687-690, Japanese Laid-Open Patent Publication No. 2003-35824, Japanese National Phase PCT Laid-Open Publication No. 8-511129, and the like are applicable.

By providing the microlens array 14, light which illuminates areas other than the pixels (apertures), i.e., light which is emitted from the backlight 41 toward a light-shielding film BM that is formed around the pixels, is guided by the microlenses 14a to the pixels and emitted from the liquid crystal display panel 100C. As a result, the efficiency of light utility of the backlight 41 is improved.

In order to obtain a high efficiency of light utility in a display panel having microlenses, such as the liquid crystal display panel 100C, it is preferable that the backlight 41 has a high directivity. In other words, it is preferable that the half-directivity angle of light emitted from the backlight 41 is small.

On the other hand, as for the pixels, a higher efficiency of light utility can be obtained as their apertures become larger. However, in a transflective-type liquid crystal display panel, its characteristics as a reflection type are also important, and only a portion of each pixel (transmission region) is used for transmission displaying; therefore, there is a limitation to the aperture ratio (area ratio of the transmission region). In many cases, the aperture ratio in a transflective-type liquid crystal display panel is 20 to 60%. Thus, the present invention is suitably used for a liquid crystal display panel having a low aperture ratio, such as a transflective-type liquid crystal display panel.

Figure 3:
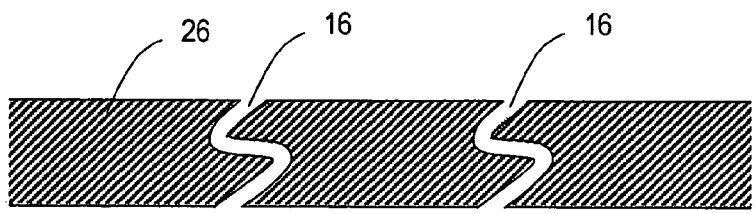
FIG. 3(*a*) to (*c*) are diagrams showing variants of vent holes according to the present embodiment.
Figure 3:
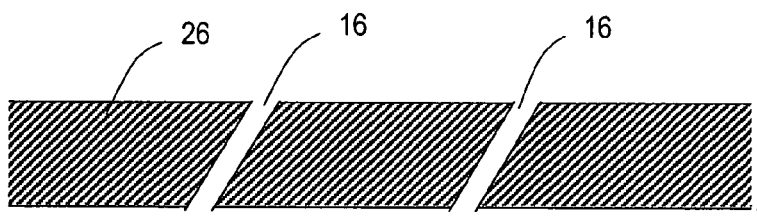
Figure 3:
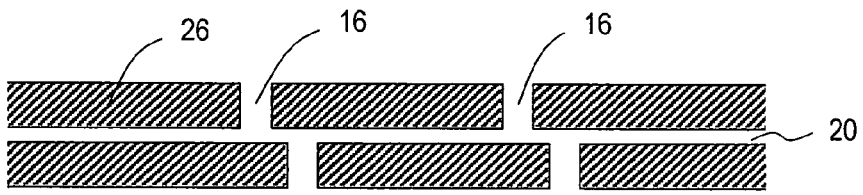

The vent holes 16 in the above-described embodiment and variants are of the configurations shown in FIG. 1(*a*) and FIGS. 3(*a*) to (*c*), but the configurations of the vent holes 16 are not limited thereto. For example, they may have a shape such that each vent hole becomes thinner (or thicker) in a part thereof, a shape such that the length of the bent portion (length along the direction the support extends) is even longer, a shape such that a portion of a crank shape extends obliquely, and so on. Otherwise, any vent hole that provides the above-described effect when adopted is encompassed by the vent holes according to the present invention.

According to the present invention, in a liquid crystal display device having an air layer which is formed between a microlens array and an optical film, vent holes are provided which are bent or extend in an oblique direction, whereby distortion, warp, deformation, peeling, and the like of the optical film during the production process of the liquid crystal display device are prevented. Moreover, portions with weak attachment strength do not localize in any portion of a support, whereby distortion, warp, deformation, peeling, and the like of the optical film are further prevented. Moreover, condensation and mixing of foreign matter, which might occur during the production or use of the liquid crystal display device, are also prevented, whereby occurrence of display unevenness is prevented.

Therefore, according to the present invention, there is provided a liquid crystal display panel with microlenses as well as a liquid crystal display device having a high strength, an execute efficiency of light utility, and a high displaying quality across the entire display surface. Moreover, according to the present invention, such a liquid crystal display panel and liquid crystal display device can be produced efficiently.

INDUSTRIAL APPLICABILITY

The present invention improves the strength and displaying quality of a liquid crystal display panel and a liquid crystal display device, and particularly improves the quality of a liquid crystal display panel and a liquid crystal display device which have a relatively small aperture ratio, such as a transflective-type liquid crystal display panel.

The invention claimed is:

1. A liquid crystal display panel with a microlens array, comprising:
    a liquid crystal display panel comprising a plurality of pixels;
    a microlens array provided on a light-incident side of the liquid crystal display panel;
    a protection layer provided in contact with at least one of the microlens array and a support which is provided in a peripheral region of the microlens array, the protection layer being made of a curable resin;
    a rear-face side optical film attached to the liquid crystal display panel via the protection layer,
    wherein a gap is formed between the microlens array and the protection layer, and
    wherein the protection layer is attached to the liquid crystal display panel via the microlens array, and the protection layer and the microlens array are attached so as to be in contact only at neighborhoods of apices of the microlenses composing the microlens array.

2. The liquid crystal display panel with a microlens array of claim 1, wherein the protection layer is made of substantially the same material as a material composing the microlens array.

3. The liquid crystal display panel with a microlens array of claim 1, wherein the protection layer is made of a material having a refractive index which is substantially equal to a refractive index of a material composing the microlens array.

4. The liquid crystal display panel with a microlens array of claim 1, wherein the support is made of the same material as the microlens array.

5. The liquid crystal display panel with a microlens array of claim 1, wherein the support is made of a photocurable resin.

6. The liquid crystal display panel with a microlens array of claim 1, wherein the rear-face side optical film is attached to the protection layer via the adhesion layer.

7. A liquid crystal display device comprising the liquid crystal display panel with a microlens array of claim 1.

8. A production method for a liquid crystal display panel with a microlens array, including a liquid crystal display panel, a microlens array provided on a light-incident side of the liquid crystal display panel, and a rear-face side optical film provided on a light-incident side of the microlens array, the method comprising:
    (a) a step of forming a microlens array on a surface of a liquid crystal display panel;
    (b) a step of forming a resin layer of curable resin on the light-incident side of the microlens array; and
    (c) a step of forming a protection layer by curing the resin layer, wherein,
    at step (b), the resin layer is formed so as to be in contact with at least one of the microlens array and a support which is provided in a peripheral region of the microlens array, and a gap is formed between the microlens array and the resin layer.

9. The production method of claim 8, wherein, in step (b), the resin layer is attached in a dry film form to at least one of the microlens array and the support.

10. The production method of claim 8, wherein, in step (b), the resin layer is formed so that the resin layer and the microlens array are in contact only at neighborhoods of apices of the microlenses composing the microlens array.

11. The production method of claim 8, wherein, in step (b), the resin layer is formed so as to be in contact only with the support.

12. The production method of claim 8 comprising, after step (c), a step of attaching a rear-face side optical film to the protection layer.

13. The production method of claim 8 comprising, before step (b), a step of attaching the resin layer to a rear-face side optical film.

14. The production method of claim 8, wherein step (a) comprises a step of forming a photocurable resin layer on a surface of the liquid crystal display panel and a step of forming the microlens array by exposing the photocurable resin layer to light through the liquid crystal display panel.

15. The production method of claim 14, wherein step (a) comprises a step of forming the support by exposing the photocurable resin layer to light through a mask.

16. The production method of claim 8, wherein the protection layer is made of substantially the same material as a material composing the microlens array.

17. The production method of claim 8, wherein the protection layer is made of a material having a refractive index which is substantially equal to a refractive index of a material composing the microlens array.

18. The production method of claim 8 comprising, after step (c), a step of cutting an attached substrate including the liquid crystal display panel, the microlens array, the protection layer, and the rear-face side optical film to form a plurality of liquid crystal display panels with microlens arrays.

* * * * *